(12) United States Patent
Neisen

(10) Patent No.: US 9,818,205 B2
(45) Date of Patent: Nov. 14, 2017

(54) SIMPLIFIED TEXTURE COMPARISON ENGINE

(71) Applicant: PPG Industries Ohio, Inc., Cleveland, OH (US)

(72) Inventor: Penny Neisen, Cleveland Heights, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 64 days.

(21) Appl. No.: 15/047,982

(22) Filed: Feb. 19, 2016

(65) Prior Publication Data

US 2017/0243362 A1  Aug. 24, 2017

(51) Int. Cl.
*G06T 7/40* (2017.01)
*G06K 9/00* (2006.01)
*G06T 7/00* (2017.01)

(52) U.S. Cl.
CPC .............. *G06T 7/407* (2013.01); *G06T 7/001* (2013.01); *G06T 7/408* (2013.01); *G06T 2200/24* (2013.01); *G06T 2207/10024* (2013.01); *G06T 2207/30156* (2013.01)

(58) Field of Classification Search
USPC ................................................ 382/108, 305
See application file for complete search history.

(56) References Cited

U.S. PATENT DOCUMENTS

| | | | |
|---|---|---|---|
| 4,344,142 A | 8/1982 | Diehr, II | |
| 4,479,718 A | 10/1984 | Alman | |
| 4,711,580 A | 12/1987 | Venable | |
| 5,231,472 A | 7/1993 | Marcus | |
| 5,319,437 A | 6/1994 | Van Aken | |
| 5,590,251 A | 12/1996 | Takagi | |
| 5,612,928 A | 3/1997 | Haley | |

(Continued)

FOREIGN PATENT DOCUMENTS

| | | |
|---|---|---|
| CN | 1635957 | 7/2005 |
| CN | 1784592 | 6/2006 |

(Continued)

OTHER PUBLICATIONS

Anonymous, "Chapter 1.3.5.17. Detection of Outliers", NIST/SEMATECH e-Handbook of Statistical Methods, Jan. 1, 2012, XP055162021.

(Continued)

*Primary Examiner* — Ishrat I Sherali
(74) *Attorney, Agent, or Firm* — Workman Nydegger

(57) ABSTRACT

A method for calculating a coating textures indicator can comprise receiving target coating texture variables from an image. The method can also comprise accessing a relative texture characteristic database that stores a set of texture characteristic relationships for a plurality of coatings. The method can further comprise calculating a correlation between the target coating texture variables and target coating texture variables associated with a compared coating. Based upon the calculated correlation, the method can comprise, calculating a set of relative texture characteristics for the target coating that indicate relative differences in texture between the target coating and the compared coating. Each of the relative texture characteristics can comprise an assessment over all angles of the target coating.

20 Claims, 7 Drawing Sheets

(56) References Cited

U.S. PATENT DOCUMENTS

| | | |
|---|---|---|
| 5,798,943 A | 8/1998 | Cook |
| 5,926,262 A | 7/1999 | Jung |
| 5,929,998 A | 7/1999 | Kettler |
| 6,166,814 A | 12/2000 | Pringle |
| 6,249,751 B1 | 6/2001 | Asaba et al. |
| 6,343,264 B1 | 1/2002 | Fenton |
| 6,449,384 B2 | 9/2002 | Di Venuto |
| 6,507,824 B1 | 1/2003 | Yon |
| 6,539,325 B1 | 3/2003 | Numata |
| 6,760,483 B1 | 7/2004 | Elichai et al. |
| 6,794,669 B2 | 9/2004 | Chelvayohan et al. |
| 6,901,379 B1 | 5/2005 | Balter |
| 6,924,817 B2 | 8/2005 | Rice |
| 6,928,454 B2 | 8/2005 | Menner |
| 7,062,722 B1 | 6/2006 | Carlin |
| 7,106,343 B1 | 9/2006 | Hickman |
| 7,187,386 B2 | 3/2007 | Rice |
| 7,193,632 B2 | 3/2007 | Rice |
| 7,230,629 B2 | 6/2007 | Reynolds |
| 7,330,585 B2 | 2/2008 | Rice |
| 7,509,271 B2 | 3/2009 | Uchimi |
| 7,536,231 B2 | 5/2009 | McClanahan |
| 7,605,824 B2 | 10/2009 | Reynolds |
| 7,804,597 B2 | 9/2010 | De Haas et al. |
| 7,809,155 B2 | 10/2010 | Nestares |
| 7,815,435 B2 | 10/2010 | Riley |
| 7,909,241 B2 | 3/2011 | Stone |
| 7,944,561 B2 | 5/2011 | Nisper et al. |
| 7,953,274 B2 | 5/2011 | Sara |
| 7,999,825 B2 | 8/2011 | Webb |
| 8,065,314 B2 | 11/2011 | Prakash |
| 8,290,253 B1 | 10/2012 | Wang et al. |
| 8,345,252 B2 | 1/2013 | Nisper et al. |
| 8,606,731 B2 * | 12/2013 | Fujieda ............... G01J 3/46 427/8 |
| 2002/0002497 A1 | 1/2002 | Tilman |
| 2002/0184232 A1 | 12/2002 | Menner |
| 2003/0197710 A1 | 10/2003 | Gonsalves et al. |
| 2003/0208345 A1 | 11/2003 | O'Neill |
| 2003/0216972 A1 | 11/2003 | Gotou |
| 2004/0046802 A1 | 3/2004 | Wright |
| 2004/0158505 A1 | 8/2004 | Kurns |
| 2005/0090919 A1 | 4/2005 | Pogue |
| 2005/0128484 A1 | 6/2005 | Rodrigues |
| 2005/0157926 A1 | 7/2005 | Moravec |
| 2005/0169518 A1 | 8/2005 | Boston et al. |
| 2005/0281480 A1 | 12/2005 | Baldwin |
| 2006/0001677 A1 | 1/2006 | Webb |
| 2006/0030060 A1 | 2/2006 | Noguchi et al. |
| 2006/0181707 A1 | 8/2006 | Gibson |
| 2006/0195369 A1 | 8/2006 | Webb |
| 2006/0232802 A1 | 10/2006 | Gray |
| 2006/0245632 A1 | 11/2006 | Nisper et al. |
| 2007/0019887 A1 | 1/2007 | Nestares |
| 2007/0172113 A1 | 7/2007 | Sai et al. |
| 2007/0200337 A1 | 8/2007 | Johnson et al. |
| 2007/0226158 A1 | 9/2007 | Woronow |
| 2007/0250273 A1* | 10/2007 | De Haas ............... G01J 3/46 702/22 |
| 2008/0056563 A1 | 3/2008 | Schiller et al. |
| 2008/0162157 A1 | 7/2008 | Daniluk |
| 2008/0177586 A1 | 7/2008 | Jamjoom |
| 2008/0228599 A1 | 9/2008 | Webb |
| 2008/0235224 A1 | 9/2008 | Rodriques |
| 2008/0255976 A1 | 10/2008 | Alterberg |
| 2008/0278723 A1 | 11/2008 | Merchak |
| 2008/0284791 A1 | 11/2008 | Bressan et al. |
| 2009/0015835 A1 | 1/2009 | Balakrishnan et al. |
| 2009/0157212 A1 | 6/2009 | McCLanahan |
| 2009/0183122 A1 | 7/2009 | Webb |
| 2009/0213120 A1 | 8/2009 | Nisper et al. |
| 2009/0274827 A1 | 11/2009 | Anderson |
| 2009/0292520 A1 | 11/2009 | Nwankpa |
| 2009/0324068 A1 | 12/2009 | Yamakawa |
| 2010/0048242 A1 | 2/2010 | Rhoads |
| 2010/0067786 A1 | 3/2010 | Wilensky et al. |
| 2010/0169255 A1* | 7/2010 | Fujieda ............... G01J 3/46 706/25 |
| 2010/0228511 A1 | 9/2010 | Chin et al. |
| 2010/0262551 A1 | 10/2010 | Caruso |
| 2011/0282613 A1 | 11/2011 | Skinner |
| 2011/0299099 A1 | 12/2011 | Xu et al. |
| 2012/0206479 A1 | 8/2012 | Bryant et al. |
| 2012/0243797 A1 | 9/2012 | Di Venuto |
| 2013/0215143 A1 | 8/2013 | Pettigrew |
| 2013/0244197 A1 | 9/2013 | Tijoe |
| 2014/0078293 A1* | 3/2014 | Beymore ............... G01J 3/504 348/135 |
| 2014/0242271 A1 | 8/2014 | Prakash et al. |
| 2014/0250109 A1 | 9/2014 | Wang |
| 2014/0278253 A1 | 9/2014 | Beymore |
| 2014/0278254 A1 | 9/2014 | Beymore |
| 2015/0023054 A1 | 1/2015 | Goda |
| 2015/0134269 A1 | 5/2015 | Norris |
| 2015/0134299 A1 | 5/2015 | Norris |
| 2015/0134300 A1 | 5/2015 | Norris |

FOREIGN PATENT DOCUMENTS

| | | |
|---|---|---|
| CN | 1797420 | 7/2006 |
| CN | 101023332 | 8/2007 |
| CN | 101730835 | 6/2010 |
| CN | 101784871 | 7/2010 |
| CN | 102449644 | 5/2012 |
| CN | 102549545 | 7/2012 |
| CN | 102667444 | 9/2012 |
| EP | 0828144 | 3/1998 |
| EP | 2161555 | * 6/2008 ............... G01J 3/46 |
| JP | 2002236850 | 8/2002 |
| JP | 58076741 | 3/2005 |
| JP | 2007505202 | 3/2007 |
| JP | 2007218895 | 8/2007 |
| JP | 2007218895 | 9/2007 |
| JP | 2012173272 | 9/2012 |
| KR | 20100102147 | 9/2010 |
| TW | 200608310 | 3/2006 |
| TW | 200821602 | 5/2008 |
| TW | 200834273 | 8/2008 |
| TW | 201339652 | 10/2013 |
| WO | 03063719 | 8/2003 |
| WO | 2004101689 | 11/2004 |
| WO | 2005124301 | 12/2005 |
| WO | 2006030028 | 3/2006 |
| WO | 2006078858 | 7/2006 |
| WO | 2006093689 | 9/2006 |
| WO | 2006096402 | 9/2006 |
| WO | 2006112864 | 10/2006 |
| WO | 2008045418 | 4/2008 |
| WO | 2008103405 | 8/2008 |
| WO | 2007096402 | 1/2009 |
| WO | 2010120873 | 10/2010 |
| WO | 2013049792 | 4/2013 |
| WO | 2014150337 | 9/2014 |

OTHER PUBLICATIONS

Paravina et al, "Evaluation of blending effect of composites related to restoration size", Dental Materials, Elsevier, Amsterdam, NL, vol. 22, No. 4, Apr. 1, 2006, pp. 299-307, XP027943381, ISSN: 0109-5641 table 2.

Takagi et al, "Prediction of spectral reflectance factor distribution of color-shift paint finishes", Color Research & Application, John Wiley & Sons, Inc., US, vol. 32, No. 5, Oct. 1, 2007, pp. 378-387, XP002604927, ISSN: 0361-2317.

"Kuncheva, Ludmila I., James C. Bezdek, and Robert PW Duin." "Decision templates for multiple classifier fusion: an experimental comparison" "Patternrecognition 34.2. 2001."

I. Lissner, U. Philipp: "Upgrading Color-Difference Formulas", Journal of the Optical Society of America, vol. 27 No. 7, Jun. 11, 2010 (Jun. 11, 2010), pp. 1620-1629, XP055152562, DOI: 10,1364/JOSAA.27.001620 Sections 1 and 2.A.

(56) References Cited

OTHER PUBLICATIONS

D. Puig, M.A. Garcia, J. Melendez: "Application-Independent feature selection for texture classification", Pattern Recognition, vol. 43, No. 10, May 10, 2010 (May 10, 2010) pp. 3182-3297, XP027095420, DOI: 10. 1016/j. patcog.2010.05.005 abstract and section 3.

J.H. Xin, S. Shao, K.F.-L. Chung: "Colour-appearance modelling using feedforward networks with Bayesian regularization method—part 1: forward model", Color Research & Application, vol. 25, No. 6, Oct. 13, 2000, pp. 424-434, XP055152560, DOI: 10.1002/1520-6378(200012)25:6<424:"AID-COL7>3.0.CO;2-Q.

E. Kirchner: "Appearance and measurement modeling an drendering of the visual texture of automotive paints", Detroit Color Council, Mar. 13, 2013, XP055153196, Retreived from the Internet: URL: http://www.detroitcc.org/files/2013March14b.pdf, [retireved on Apr. 3, 2013] Models for predicting Texture.

E.J.J. Kirchner, J. Ravi: "Setting tolerances on color and texture for automotive coatings", Color Research & Application, vol. 39, No. 1, Jul. 25, 2012 pp. 88-98, XP055152561, DOI:10.1002/col.21767.

PPG Automotive Refinish: "RapidMatch™ X-5:guida utente", Pittsburgh Plate Glass (PPG) Industries, 2013, XP055153237, retireved from the Internet: URL:http://it.nexaautocolor.com/media/213903/rapidmatch_v1-2012_email_version.pdf [retrieved on Sep. 22, 2014].

Kokla, Vassiliki et al., A Bayesian decision model for watercolour analysis, Proc. of SPIE, 2007, vol. 6618, pp. 66180S-1-66180S-9.

Dekker et al., "Total Appearance Differences for Metallic and Pearlescent Materials: Contributions From Color and Texture", Color Research & Application, Feb. 2011, pp. 4-14, vol. 36, No. 1.

Huang et al., "Camera-based model to predict the total difference between effect coatings under directional Illumination", Chinese Optics Letters, Sep. 10, 2011, pp. 093301-1 through 093301-5, vol. 9, No. 9.

* cited by examiner

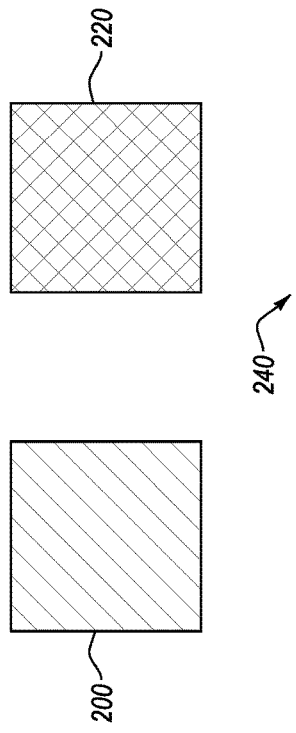

| | A Lot Less Than Target | A Little Less Than Target | Relatively Equal To Target | A Little More Than Target | A Lot More Than Target |
|---|---|---|---|---|---|
| Described As When You Consider, Coarseness, Sparkle Intensity, And Sparkle Density, How Would You Characterize The Overall Texture Of This Matched Pair | | | | | X |
| Overall Perceived Coarseness | | X | | | |
| Described As Flake Size. How Would You Characterize The Overall Difference Of The Flake Size Of This Matched Pair | | X | | | |
| Overall Perceived Sparkle Intensity | | | | | |
| Described As Individual Flake Brightness How Would You Characterize the Overall Difference Flake Brightness Of This Matched Pair | | | X | | |
| Overall Perceived Sparkle Density | | | | | |
| Described As The Space Between Individual Flakes. How Would You Characterize The overall Difference Of The Distance Between Flakes Of This Matched Pair | | | | | |

*FIG. 2B*

SIMPLIFIED TEXTURE COMPARISON ENGINE

BACKGROUND OF THE INVENTION

Coatings have been used for hundreds of years for protection and to add visual appeal to products and structures. For example, houses are painted or stained in order to protect the underlying siding from the weather and also to add aesthetic qualities to the house. Similarly, automobiles are painted, sometimes with multiple purpose-made layers, to protect the metal body of the vehicle and also to add visual appeal to the vehicle.

Various coatings may have specific features and properties that are beneficial or desirable for certain uses. For example, different coatings can have different electrical conductive properties, different chemical reactivity properties, different hardness properties, different UV properties, and other different use-specific properties. Additionally, coatings may comprise unique visual features. For example, some automotive coatings comprise texture features that give the coating unique visual effects.

The ability to provide highly consistent coating compositions is an important aspect in many different coating markets. For example, it is desirable for decorative coatings to comprise consistent colors and visual features. Similarly, the ability to match previously applied coatings to available coating colors is important. For example, when fixing a scratch in a car's coating, it is desirable to match both the color and the texture of the original coating. The ability to match coatings requires both consistent coating compositions and tools for correctly identifying the target coating and/or identifying an acceptable composition to match the target coating.

Significant technical difficulties exist in providing complex coating and texture information to end users. For example, coating information involves large numbers of distinct measurements from different angles. The resulting datasets can be large and difficult to use in practice. As such, there is a need for technically sound methods and schemes for processing large coating datasets and presenting the resulting information to end users in consistent terms that are easy to use and understand.

BRIEF SUMMARY OF THE INVENTION

The present invention comprises, among other things, computer-implemented methods, systems, and computer-program products for calculating a coating texture indicator.

For example, one method for calculating a coating textures indicator comprises receiving target coating texture variables from an image of a target coating. The method also comprises accessing a relative texture characteristic database that stores a set of texture characteristic relationships for a plurality of coatings. The method further comprises calculating a correlation between the target coating texture variables and bulk texture data variables associated with a compared coating. The method still further comprises, based upon the calculated correlation, calculating a set of relative texture characteristics for the target coating that indicate relative differences in texture between the target coating and the compared coating. The relative texture characteristics, in turn, comprise an assessment over all angles of the target coating.

Additionally, the present invention comprises a computerized system configured to perform a method for calculating coating texture indicators. In one exemplary implementation, for example, the system receives target coating texture variables, which can comprise bulk texture data variables generated from an image of a target coating. The system also identifies, based upon information received from the camera-enabled spectrophotometer, a coating color associated with a target coating. In addition, the system accesses a relative texture characteristic database, which comprises a set of relative texture characteristics for one or more coatings that are related to the coating color. Furthermore, the system calculates a correlation between the target coating texture variables and bulk texture data variables associated with the proposed matched coating. Still further, based upon the calculated correlation, the system calculates a set of relative texture characteristics for the proposed matched coating that indicate relative differences in texture between the target coating and the proposed matched coating. Each of the relative texture characteristics can comprise an assessment over all angles of the target coating. Further still, implemented method can include transmitting digital data capable of causing a display to depict the set of relative texture characteristics.

Further, the present invention comprises a method for calculating a coating textures indicator. In this exemplary implementation, the method comprises receiving target coating texture variables from an image of a target coating, which can comprise bulk texture data variables generated from the image. The method also comprises accessing a relative texture characteristic database, which comprises a set of texture characteristic relationships for a plurality of coatings. Additionally, the method comprises calculating a correlation between the target coating texture variables and bulk texture data variables associated with a plurality of different coatings. Still further, the method comprises, based upon the calculated correlation, calculating a set of relative texture characteristics for the target coating that indicate relative differences in texture between the target coating and the plurality of different coatings, wherein each of the relative texture characteristics comprises an assessment over all angles of the target coating. The method also comprises transmitting digital data capable of causing a display to depict the set of relative texture characteristics.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered in the following by reference to the appended drawings. Understanding that these drawings depict only exemplary or typical implementations of the invention and are not therefore to be considered to be limiting of its scope, the invention will be described and explained with additional specificity and detail through the use of the accompanying drawings in which:

FIG. 2B depicts another relative texture characteristic chart and accompanying example coatings in accordance with implementations of the present invention;

DETAILED DESCRIPTION

The present invention extends to methods and systems configured to characterize a target coating with respect to one or more previously analyzed reference coatings. Herein, computer systems and data acquisition devices may be used to gather texture information from a target coating and generate one or more texture outputs that describe the target coating relative to one or more other coatings. The present invention may employ computer systems and data acquisition devices for receiving large data sets of texture variables and transforming the large dataset into simplified and readily useable texture value indicators. Further, the present invention may also comprise data transformations for mapping unprocessed texture variables to human-perceived texture characteristics. Implementations of the present invention provide novel and non-obvious improvements to the field of coating matching.

Accordingly, the present invention provides novel and innovative systems and methods for analyzing and matching a wide range of coating textures in a highly reliable way using human-understandable qualitative values (e.g., "coarseness," "sparkle," "intensity," etc.) Thus, in contrast to conventional methods of displaying texture differences with few or otherwise difficult to understand characteristics, the present invention can provide a wide range of simple and clear information that is understandable by a lay person. Additionally, the present invention can provide a true visual texture match for an analyzed coating. In particular, according to the present invention a target coating may be matched to reference data that is based upon visual impressions (typically human impressions) of a large cross-section of the general population. As such, the present invention can provide a simpler and more accurate means for analyzing and matching coating texture, and hence for an end user to make meaningful coating selections.

Figure 1:
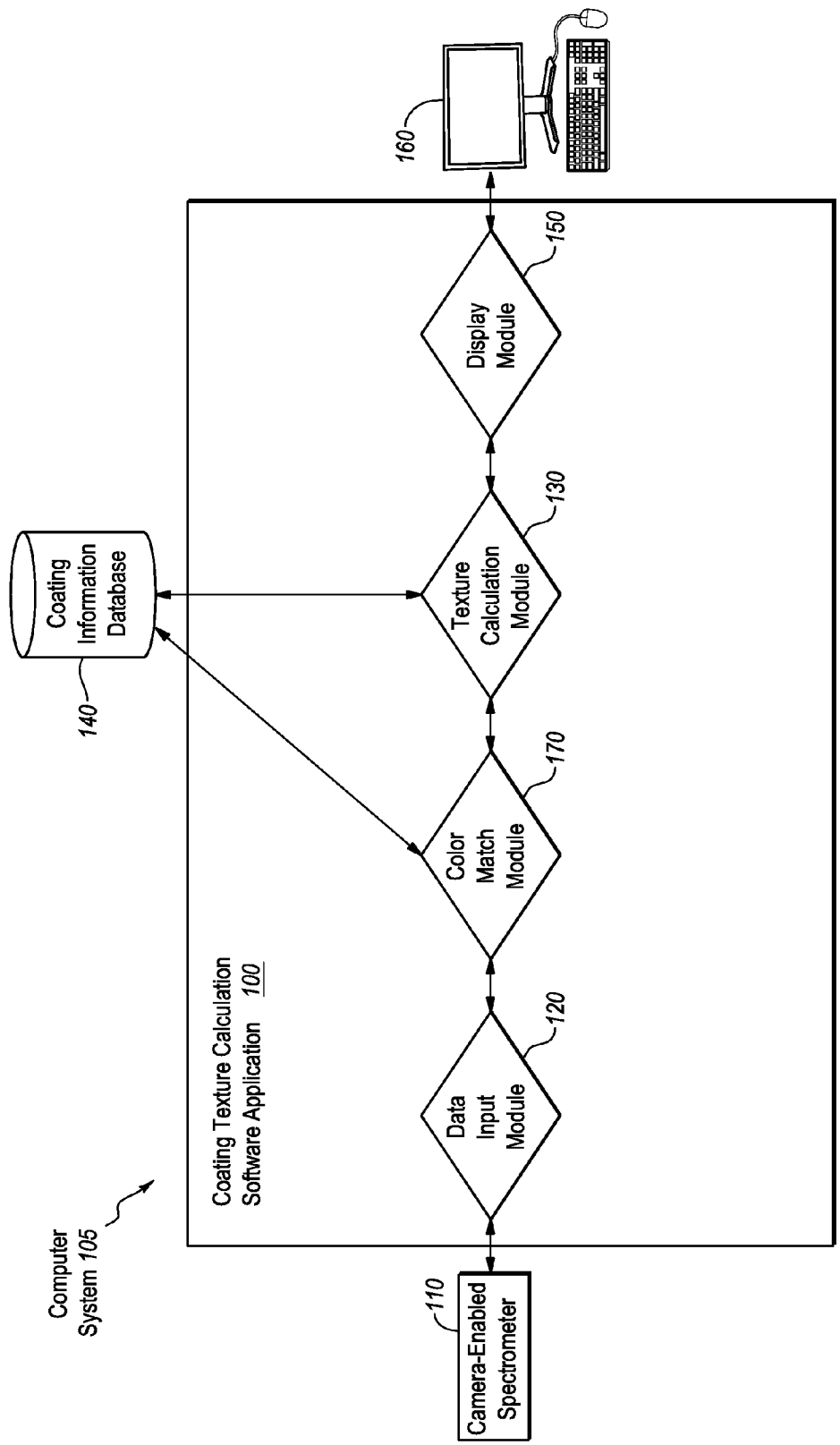
FIG. 1 depicts a schematic diagram of a system for calculating a coating texture in accordance with implementations of the present invention.

FIG. 1 depicts a schematic diagram of a system 105 configured for use in calculating a coating texture in accordance with one or more aspects of the present invention. As understood herein, system 105 can comprise any number or combination of computing devices 160, such as the depicted desktop computer system, and/or any one or more laptop computers, mobile devices, and personal device assistants (PDAs), as well as more complex systems including remote data or application servers (not shown). FIG. 1 further shows that system 105 can include one or more coating information databases 140. As understood more fully herein, coating information databases 140 can include a wide variety of information relevant to various coating characteristics, and human-perceptions of the coating characteristics, and can include data related to one or more "relative texture characteristic databases." FIG. 1 further shows that the one or more coating information databases 140 may be integrated within system 105, such as a data structure of coating texture calculation software application 100, or may be located within a purpose-built database that is located locally or remotely to the coating texture software application 100. One will appreciate that the software application program(s) 100, in turn, can comprise any number of computer-executable modules configured to execute the steps and functions described herein.

For purposes of this specification and claims, a "module" means a set of one or more logical, computer-executable functions and/or one or more computer application subroutines, which are executed within the coating texture calculation software application 100. Whereas, a "component" is understood herein as a physical component that is used within the computer system 105, such as camera-enabled spectrophotometer 110. In addition, a "database" means a computer-based data structure, including, for example, linked lists, hash maps, SQL databases, and other organized-data. One of ordinary skill in the art will readily appreciate and understand that the above definitions for modules and components are somewhat arbitrary and that one having skill in the art will be able to discern the scope and purpose of each respective module and component recited herein.

Returning to FIG. 1, in at least one embodiment, data input module 120 can be configured to receive from camera-enabled spectrophotometer 110 (or, herein, "spectrophotometer 110") certain "target coating texture variables" and coating color variables from an image taken from a target coating (not shown). As understood herein, a "target coating" generally means a coating, such as a paint, gloss, stain, or other applied treatment after application to a target object (not shown), such as a device, automobile, wall, etc. However, a target coating is not so limited, and in some implementations may include primarily unapplied solutions.

In addition, "target coating texture variables" mean raw data received from a target coating that reflect unique attributes of the target coating, which in turn is based at least in part on the underling texture elements (e.g., aluminum flakes, crushed mica, pearl, etc.) within the coating mixture. The texture elements combine with the coating to create corresponding texture effects that are reflected in the spectrophotometer data, and thus create a unique profile or signature from one coating to the next. Thus, by way of explanation, the "variable" aspect of this term generally owes to the notion that the received texture data taken by spectrophotometer 110 from the coated object will be generally consistent within the same coating with the same texture elements, but will "vary" at certain points in the data with coatings (same or different coatings) with different texture elements. Thus, as understood more fully herein, target coating texture variables are in essence a texture "signature" for the texture elements within in a particular coating of a company's coating collection.

Although one will readily appreciate that different camera-enabled spectrophotometers (e.g., brands thereof) will relay different raw data and different variables as an output for any particular coating texture, the raw data between different camera-enabled spectrophotometers can still be processed in accordance with the present invention to provide a unique "signature" (or set of "target coating texture variables") from one coating to the next. This will generally be the case when a given camera-enabled spectrophotometer comprises an internally consistent scheme for measuring texture variables from a target coating. Hence, one will appreciate as understood more fully herein in context of the present invention, the exact value of the data taken from any given spectrophotometer is not ordinarily as relevant as the variances in the data that are consistent among coatings with particular types of texture elements.

One will appreciate that the coating data can be obtained a number of different ways through spectrophotometer 110. In some embodiments, for example, the target coating texture variables may be derived from a photograph of a coating (taken from a camera without a spectrophotometer) that is analyzed within the coating texture calculated software application 100. In other embodiments, the target coating texture variables may be directly received from a camera-enabled spectrophotometer. In various embodiments, and as described above, the actual target coating texture variables received from the spectrophotometer 110 may depend upon the brand and type of camera-enabled spectrophotometer. For example, the actual target coating texture variables received from the camera-enabled spectrophotometer may comprise proprietary manipulations and outputs, such that the number of variables and measured texture attributes that are represented by each variable are uncertain to anyone but the producer of the specific camera-enabled spectrophotometer. Nevertheless, the data obtained from any given brand of spectrophotometer 110 will provide a unique texture signature for the analyzed coating texture.

FIG. 1 shows that software application 100 is in communication with camera-enabled spectrophotometer 110 via data input module 120. To accomplish this communication, one will appreciate that the data input module 120 can be in communication with (or otherwise implement) one or more application program interfaces ("API(s)") (not shown) that enable the software application 100 to receive input into and/or send output out of the coating texture calculating software application 100. This communication between data input module 120 and spectrophotometer 110 (and any intervening APIs) can be accomplished via any physical or wireless connection means and corresponding communication interface layers. In any case, camera-enabled spectrophotometer 110 provides the software application 100 with a set of target coating texture variables for a target coating.

In alternate implementations, the data input module 120 may directly receive an image of a coating. For example, one or more computing devices 160 on which software application 100 is installed may further comprise a link to one or more cameras (not shown), and may enable the computing devices 160 to receive a photograph. One will appreciate that, in at least one implementation, software application 100 is in communication with a camera configured to take photographs with at least three-times optical zoom.

However the image data is received, the data input module 120 can be configured to analyze the image of the coating and calculate desired texture variables. For example, data input module 120 may utilize a black-and-white image taken from a coating sample to calculate the set of texture variables for the target coating because calculations can be simplified by removing color information. In other words, in at least one implementation, data input module 120 may be configured to first strip color from the received image file before calculation. In contrast, in at least one implementation, a color image can be used to calculate the set of texture variables for the target coating because additional texture information may be available in a color image that would not otherwise be accessible in a black-and-white image.

FIG. 1 further shows that data input module 120 can provide the coating color variables to a color match module 170. The color coating variables can be received from a spectrophotometer and processed using conventional methods. Using the coating color variables, the color match module 170 can search a coating information database 140 for one or more colors that most closely match the color of the target coating. In at least one implementation, each of the colors stored within the coating information database 140 can be associated with a particular coating and with coating texture variables. For example, the color match module 170 may determine that the target coating comprises a forest green color that is similar to a particular group of colors stored within the coating information database 140.

Once one or more proposed matching colors have been identified, the color match module 170 can provide the texture calculating module 130 with one or more indicators (not shown) of the proposed matches. The indicators can comprise pointers to the proposed matches within the coating information database, to data structures comprising information about each proposed match, or to any other data communication that provides the texture calculating module 130 with access to the necessary coating information for the proposed matches.

As shown in FIG. 1, the texture calculation module 130 can then access, from within the coating information database 140, the coating texture variables that are associated with each of the one or more proposed matching coatings. Using the coating texture variables associated with the proposed matching coatings and the coating texture variables associated with the target coating, the texture calculation module 130 can calculate a correlation between the target coating and each of the proposed matching coatings. Based upon the calculated correlation, the texture calculation module 130 can calculate a set of relative texture characteristics for the proposed matching coating that indicate relative differences in texture between the proposed matching coating and the target coating. Each of the relative texture characteristics can comprise an assessment over all angles of the target coating.

In one implementation, the relative texture characteristics can be based on human-provided relative visual impressions between different reference coatings. For example, the relative visual impressions can comprise human generated values pertaining to a relative coarseness, a relative sparkle intensity, and/or a relative sparkle density with respect to a plurality of different reference coatings. In one implementation, the relative impressions can be gathered from a large group of diverse individuals that have viewed several different coating samples with respect to each other. In such a case, the data may reflect impressions by the individuals as to various texture characteristics of the samples.

For instance, in at least one implementation, an individual can be prompted to rate the respective samples as having relatively more or less overall texture on a numeric scale. Similarly, Individuals can rate the respective samples on a relative scale with respect to coarseness, sparkle intensity, and/or sparkle density. The relative impressions can then be statistically mapped to coating texture variables that are associated with each of the respective samples. Accordingly, a statistical correlation can be created between each of the coating texture variables received from the spectrophotometer and the human perception of various texture characteristics.

The texture calculation module 130 can utilize the statistical correlation of texture variables to identify a set of relative texture characteristics of the target coating (not shown) with respect to each of the proposed coating matches. For example, the texture calculation module 130 can calculate a relative coarseness value, a relative sparkle density value, and/or a relative sparkle intensity value of a proposed matched coating. Additionally, the texture calculation module 130 can calculate an overall relative texture characteristic value for a proposed, matched coating based upon the set of relative texture characteristics determined from the texture variables. For example, the overall relative texture characteristic value can be directly derived from correlation to human perception, or the overall relative texture characteristic value can be calculated from an average of other relative texture data.

Upon receipt of data from a particular target coating via spectrophotometer 110 (or other appropriate camera device), the display module 150 can send display instructions for one or more graphics to a display unit on computing device 160. The graphics, in turn, display relative texture characteristics to a user through a graphical user interface, such that the user can easily identify the difference in texture characteristics between the target coating (not shown) and each of the proposed matching coatings (not shown). One will appreciate that the displayed characteristics can take on multiple forms. In one embodiment, the displayed relative texture characteristics may comprise the single overall texture value, the relative coarseness value, the relative sparkle density value, and/or the relative sparkle intensity value for a matched coating. As such, various implementations of the present invention can significantly simplify and standardize the texture information that is displayed to an end user.

Providing a simple indication of a human-perceived difference between one or more coatings can provide significant improvements to the technical field of coating matching. In particular, providing a consistent and standard basis for distinguishing texture attributes of a coating addresses significant shortcomings in the technical art. As such, utilizing a statistically standardized approach to utilizing human-perception of texture differences can provide an innovative method for matching coating textures. For example, in at least one implementation, relative texture values can be provided with respect to all available coating compositions, such that it is not necessary to identify specific potential matching coatings in order to generate relative texture values. Instead, standardized texture values can be calculated based upon a color and texture space that includes one or more coating manufacturer's entire coating library.

Figure 2A:
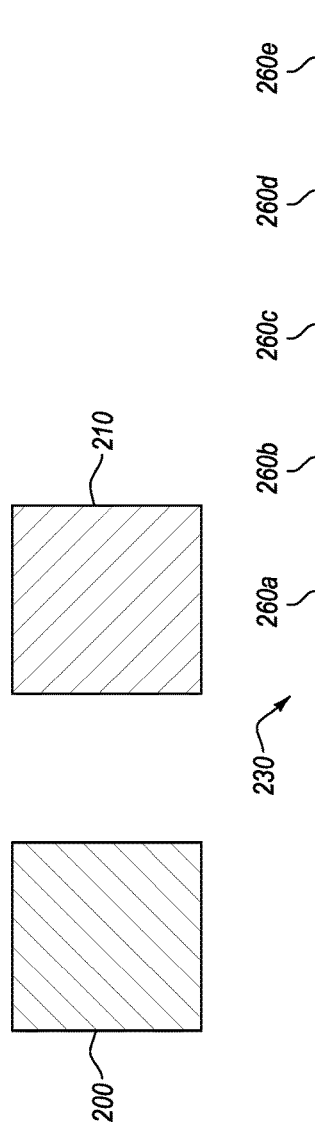
FIG. 2A depicts a relative texture characteristic chart and accompanying example coatings in accordance with implementations of the present invention.

FIG. 2A depicts an example of a chart 230 derived from gathering and utilizing human-perceived texture differences within implementations of the present invention. In particular, FIG. 2A depicts a first example coating 200, a second example coating 210 and a human-perspective texture comparison chart 230. While the first example coating 200 and the second example coating 210 are depicted in image form in FIG. 2A, when presented to a user, the first example coating 200 and the second example coating 210 can also be actual painted and cured panels. As such, the user(s) are provided with true and accurate representations of the final coating color and texture.

The human-perspective texture comparison chart 230 is directed towards differences in visual appearance between the first example coating 200 and the second example coating 310. For example, the human-perspective texture comparison chart 230 requests that a human user indicate whether they perceive that the first example coating 200 comprises more or less overall perceived texture than the second example coating 210. As indicated by the human-perspective texture comparison chart 230 of FIG. 2A, a human user may be asked to rate the two example coatings 200, 210 with regards to a variety of different texture characteristics. Each rating may be provided using a predefined scale of rating options 260(*a-e*).

A large number of users with different racial, gender, and other demographic differences can be asked to compare the same two example coatings 200, 210 and provide their own respective perceived texture differences. The total resulting perceptions of the variety of users can then be respectively summarized such that a typical, or most-likely, predicted human-perceived texture comparison for each requested texture question is calculated.

In the example depicted in FIG. 2A, the user determined that the first example coating 200 comprises a "little less" overall perceived texture than the second example coating 210. Additionally, FIG. 2A shows that the user determined that the first example coating 200 comprises "relatively equal" perceived coarseness to the second example coating 210. Further, FIG. 2A shows that the user determined that the first example coating 200 comprises "a lot less" sparkle intensity than the second example coating 210. Further still, FIG. 2A shows that the user determined that the first example coating 200 comprises a "little less" sparkle density than the second example coating 210.

FIG. 2B depicts a similar human-perspective texture comparison chart 230 to the one depicted in FIG. 2A. In FIG. 2B, however, the chart shows that the user compares the first example coating 200 to a third example coating 220. As indicated by the human-perspective texture comparison chart 240 of FIG. 2B, the third example coating 220 comprises a different texture characteristic profile than either the first example coating 200 or the second example coating 210.

Figure 2C:
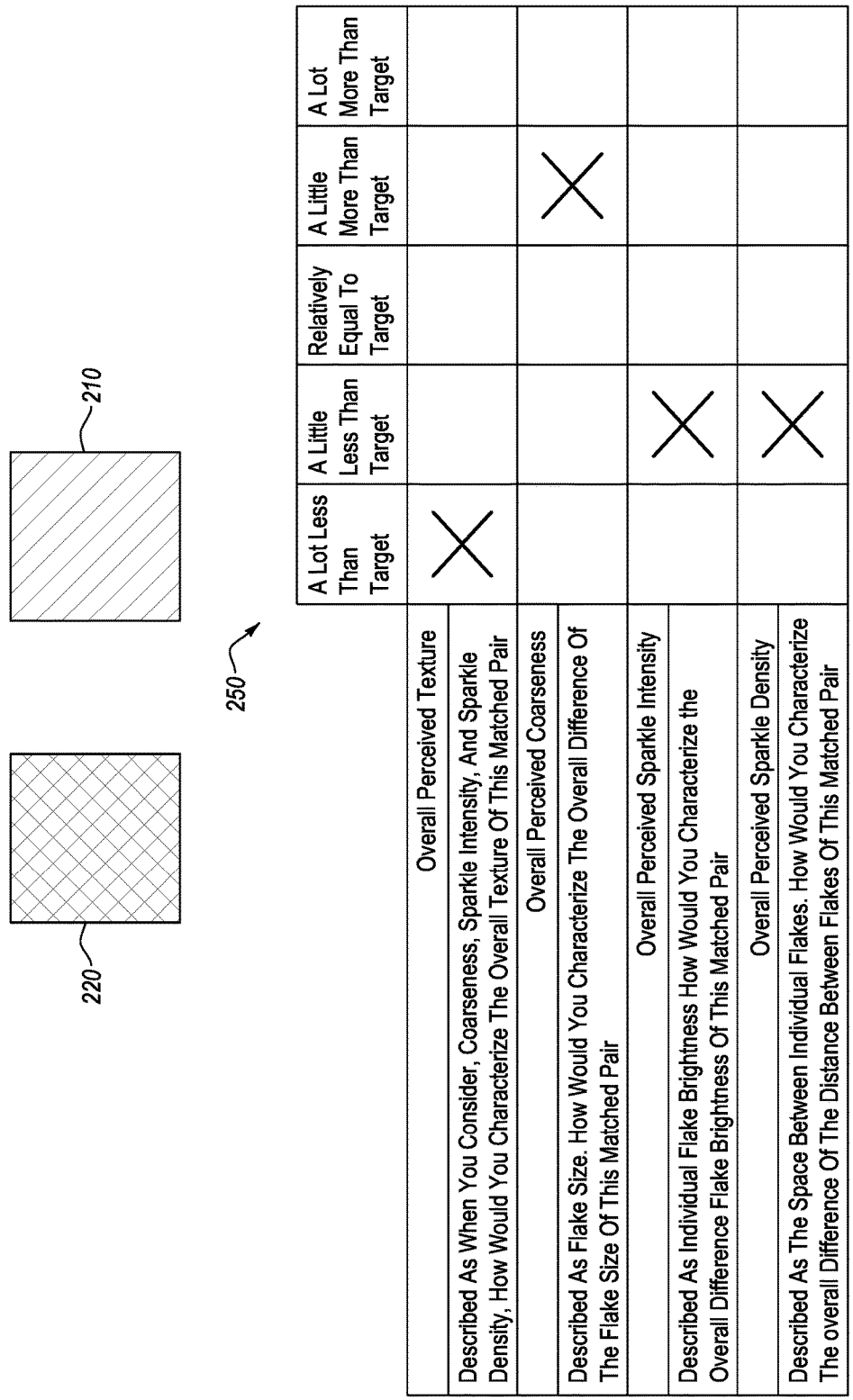
FIG. 2C depicts yet another relative texture characteristic chart and accompanying example coatings in accordance with implementations of the present invention.

FIG. 2C depicts yet another human-perspective texture comparison chart 230. In this particular depiction, a user is comparing the third example coating 220 to the second example coating 210. Accordingly, FIGS. 2A-2C illustrate several different results that may be derived from human-perceived comparisons between a variety of different example coatings and to provide human-perspective comparisons between the example coatings across a range of different texture characteristics. The human-perspective comparisons provided to the human-perspective texture comparison charts 230 of FIGS. 2A-2C can be translated into relative numerical values. The resulting values can then be stored in a coating information database 140.

Figure 3:
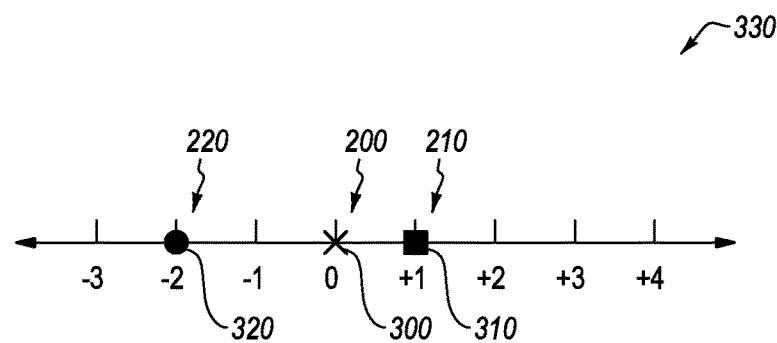
FIG. 3 depicts a line chart of relative texture characteristics in accordance with implementations of the present invention.

For example, FIG. 3 depicts a number line 330 with indications 300, 310, 320 of each respective example coating 200, 210, 220. In particular, FIG. 3 shows that the "X" indication 300 represents the first example coating 200, while the square indicator 310 represents the second example coating 210, and the circle indicator 320 represents the third example coating 220. The illustrated number line 330 may represent the examples coatings 200, 210, 220 relative relationships to each other with respect to their overall perceived texture. One will understand that the number line 330 is merely exemplary and is provided for the sake of clarity and example. In practice the relationship between various texture characteristics of different coatings may comprise a far more complex, multi-variable relationship that is much more difficult to conveniently depict and describe. Accordingly, the number line 330 is provided as a simplified example to establish various innovative and novel features in implementations of the present invention.

The human-perspective texture comparison charts 230, 240, 250 of FIGS. 2A-2C comprise five different relative indications 260(a-e). In at least one implementation, a relative value can be assigned to each indicator for each comparison between two respective example coatings, with one of the example coatings being considered the "target" from which the other example coating is to be compared. For example, the "a lot less than target" indicator 260a may be assigned a relative value of −2, the "a little less than target" indicator 260b may be assigned a relative value of −1, the "relatively equal to target" indicator 260c may be assigned a relative value of 0, the "a little more than target" indicator 260d may be assigned a relative value of +1, and the "a lot more than target" indicator 260e may be assigned a relative value of +2. One will understand that the above provided integers of −2, −1, 0, +1, +2 are provided for the sake of example and clarity. Various implementations can utilize different schemes, including non-integer and non-numerical schemes to quantify human-perception.

Returning to the human-perspective texture comparison in FIG. 2A with respect to "overall perceived texture," the user indicated that the first example coating 200 comprises "a little less" overall perceived texture than the second example coating 210. As such, a numerical value of −1 can be assigned to the first example coating 200 with respect to the second example coating 210.

In FIG. 2B with respect to "overall perceived texture," the user indicated that the first example coating 200 comprises "a lot more" overall perceived texture than the third example coating 220. As such, a numerical value of +2 can be assigned to the first example coating 200 with respect to the third example coating 220.

In FIG. 2C with respect to "overall perceived texture," the user indicated that the third example coating 220 comprises "a lot less" overall perceived texture than the second example coating 210. As such, a numerical value of −2 can be assigned to the third example coating 220 with respect to the second example coating 210.

An analysis of the above human-perspective texture comparison data reveals that the third example coating 220 comprises "a lot less" overall perceived texture than both the first example coating 200 and the second example coating 210. This conclusion can be reached based upon the assumption that the human-perspective texture comparison data in FIG. 2B, which indicates that the first example coating 200 comprises "a lot more" perceived texture than the third example coating 220, is the equivalent to the third example coating 220 comprising "a lot less" perceived texture than the first example coating 200. A further, similar analysis of the human-perspective texture comparison data reveals the second example coating 210 comprises a little more overall perceived texture than the first example coating 200, and a lot more overall perceived texture than the third example coating 220.

These relationships can be depicted by placing the "X" indicator 300 for the first example coating 200 at "0" on the number line 330. In this example, the first example coating 200 is placed at the "0" as a form of normalizing the numerical relationships around the median human-perspective texture comparison data point—in this case, the first example coating 200. The above data indicated that the second example coating 210 was +1 higher in texture than the first example coating 200. This relationship can be represented by placing the square indicator 210 for the second example coating 210 on the "+1" on the number line 330.

The placement of the third example coating 220 on the number line 300 may comprise accounting for two different human-perspective texture comparison data points. For example, the human-perspective texture comparison data indicates that the third example coating 220 comprises "a lot less" overall perceived texture than the second example coating 210. Additionally, the human-perspective texture comparison data indicates that the first example coating 200 comprises "a lot more" overall perceived texture than the third example coating 220. In other words, assigning a numerical value to the relationships would require that the third example coating 220 be assigned a numerical value of −2 with respect to both the first example coating 200 and the second example coating 210.

Because the first example coating 200 and the second example coating 210 have different overall perceived textures with respect to each other, in at least one implementation, the numerical value of −2 assigned to the third example coating 220 can be treated as a minimum difference. As such, the third example coating 220 can be placed on the number line 330, such that it is at least a numerical value of −2 lower than both the first example coating 200 and the second example coating 210. This relationship is depicted in FIG. 3 by placing the circle indicator 320 for the third example coating 220 at the "−2", while placing the "X" indicator 300 for the first example coating 200 at "0" on the number line 330, and placing the square indicator 210 for the second example coating 210 on the "+1" on the number line 330.

While the number line 330 of FIG. 3 is limited to data from the first example coating 200, the second example coating 210, and the third example coating 220, one will appreciate that in at least one implementation, the number line 330 can comprise information from a company's entire coating portfolio or from a large number of random coatings. Creating a number line 330 that accounts for a large number of coatings may result in a standard basis by which any coating (whether originally accounted for on the number line or not) can be rated. Stated more generally, comparing a large number of different coatings, and their associated textures, can result in a standard comparison metric by which textures can be universally compared. The universal standard may allow a user to enter a single coating into the coating texture calculation software application 100 and receive an indication of how the coating's texture compares with respect to the large number of randomly entered coating textures. Accordingly, in at least one implementation, the coating texture calculation software application 100 can provide standardized indicators regarding the texture of a particular coating, without requiring the user to enter specific comparison coatings.

Figure 4:
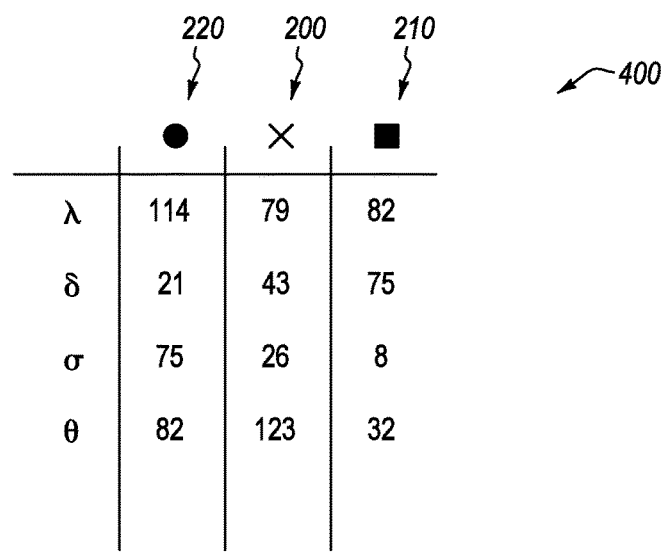
FIG. 4 depicts a table of texture variables in accordance with implementations of the present invention.

FIG. 4 depicts a coating analysis output data table 400 comprising example data received from a spectrophotometer 110. FIG. 4 depicts four exemplary target coating texture variables ($\lambda$, $\delta$, $\sigma$, and $\theta$) for the first example coating 200, the second example coating 210, and the third example coating 220, respectively. As used herein, the target coating texture variables $\lambda$, $\delta$, $\sigma$, and $\theta$, are merely exemplary. Various different spectrophotometers may provide unique proprietary output data. Similarly, in implementations where the coating texture calculation software application 100 processes images (i.e., photographs) itself, it may also provide a unique data set of output variables. Accordingly, the examples provided here with respect to variables $\lambda$, $\delta$, $\sigma$, and θ are merely for the sake of clarity and discussion and should not be read to limit the present invention to any particular method, system, or apparatus.

In at least one implementation, the coating analysis output data table 400 and the human-perspective texture comparison charts 230 can be statistically analyzed with pattern matching algorithms, machine learning techniques, or otherwise analyzed to identify correlations and patterns between the various variables within the data table 400 and the relative texture characteristics obtained by human-perspective texture comparisons. For example, it may be identified that there is an inverse relationship between the difference between λ and δ and the overall perceived texture of a coating. For example, with respect to the third example coating 220, λ is 114 and δ is 21, which results in a difference of 93. In contrast, the differences between λ and δ for the first example coating 210 and the second example coating 200 are 36 and 7, respectively. As such, the third example coating 220 with the least amount of overall perceived texture comprises the greatest difference between λ and δ, while the second example coating with the greatest amount of overall perceived texture comprises the least difference between λ and δ.

In at least one implementation, correlations and/or relationships can be identified between the coating analysis output data table 400, and a wide variety of different random coatings. Additionally, the identified correlations and/or relationships can be used to derive formulas describing the identified correlations and/or relationships. As such, the coating texture calculation software application 100 can process a new, unique coating and interpolate various human-perspective texture characteristics.

Figure 5:
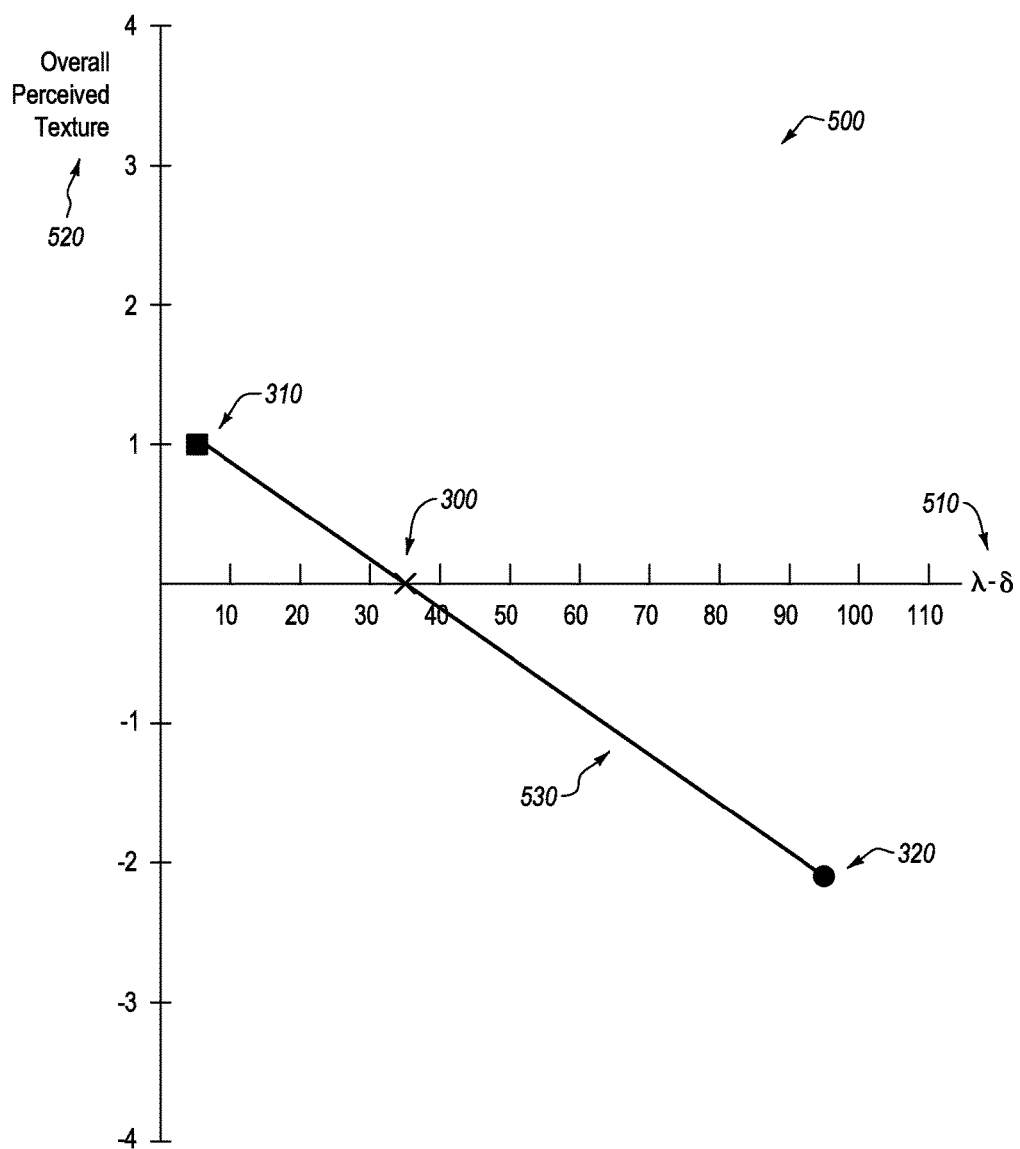
FIG. 5 depicts a graph of a correlation of perceived texture characteristics in accordance with implementations of the present invention.

For example, FIG. 5 depicts a graph 500 of the differences between λ and δ for the first, second, and third example coatings, along with their respective overall perceived texture. In particular, the graph 500 depicts overall perceived texture 520 on the Y-axis and the difference between λ and δ 510 on the X-axis. Additionally, using conventional curve fitting algorithms or other complex statistical analysis, an equation can be developed that draws a line 530 between each of the respective data points 310, 300, 320.

In at least one implementation, the equation can then be used to interpolate the overall relative perceived texture for other coatings, based upon the λ and δ variables received from the respective target coating. While the equation of FIG. 5 is depicted as being linear and only depending upon the difference between λ and δ, in at least one implementation, the relationship between the received output variables and a particular perceived texture characteristics may be far more complex. As such, the graph 500 and relationship depicted in FIG. 5 is provided only for the sake of example and clarity. Accordingly, equations, similar to that presented in FIG. 5, can be used to numerically calculate various relative texture characteristics of coatings.

Accordingly, FIGS. 1-5 and the corresponding text depict or otherwise describe various implementations of the present invention that are adapted to analyze texture characteristics of a coating. In particular, the present invention can identify how texture characteristics of a particular coating would be perceived by a human user. One will appreciate that implementations of the present invention can also be described in terms of flowcharts comprising one or more acts for accomplishing a particular result. For example, FIG. 6 and the corresponding text describe acts in a method for identifying how texture characteristics of a particular coating would be perceived by a human user. The acts of FIG. 6 are described below with reference to the elements shown in FIGS. 1-5.

Figure 6:
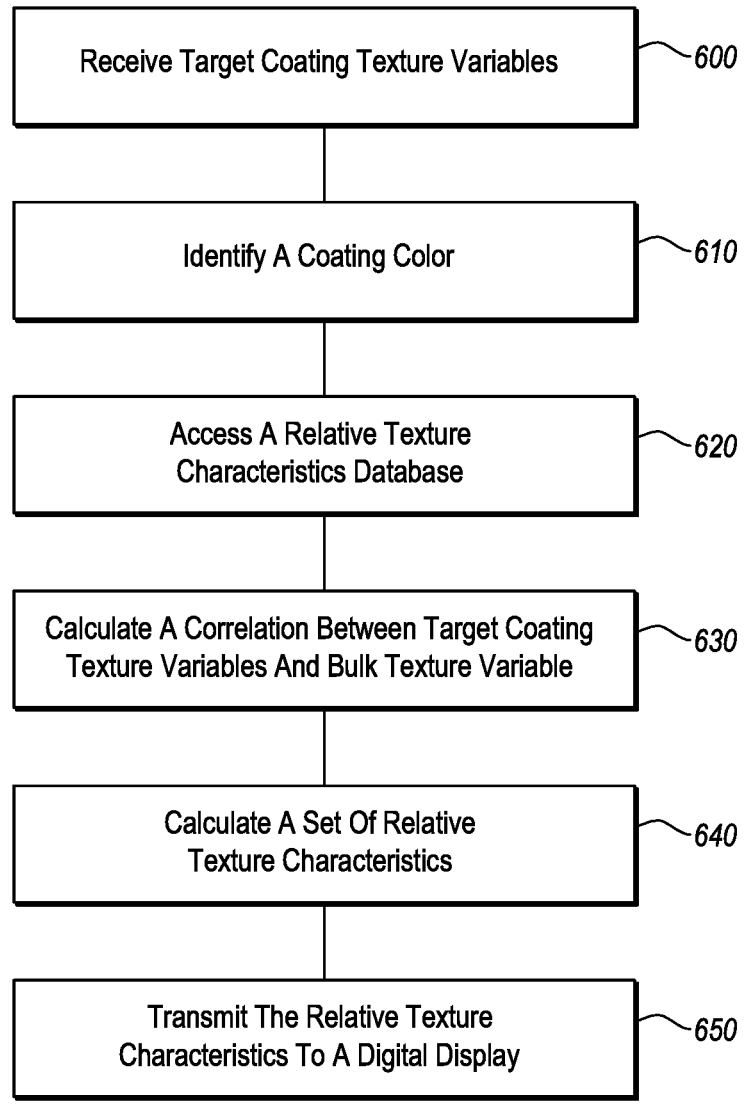
FIG. 6 depicts a flow chart of steps within a method for calculating a texture characteristic in accordance with implementations of the present invention.

For example, FIG. 6 illustrates that a method for calculating a coating textures indicator can include an act 600 of receiving target coating texture variables. Act 600 can comprise receiving target coating texture variables from a spectrophotometer or an image. The target coating texture variables can comprise texture data variables generated by the camera-enabled spectrophotometer or texture data variable calculated based upon a received image. For example, as depicted and described with respect to FIG. 1, a coating texture calculation software application 100 (e.g., executed on computing devices 160) can receive from a camera-enabled spectrophotometer 110 various coating texture variables. The received variable may be specific to the device that is used to analyze the target coating and provide the variables.

Additionally, FIG. 6 shows that the method can include an act 610 of identifying a coating color. Act 610 can comprise identifying, based upon information received from the camera-enabled spectrophotometer, a coating color associated with a target coating. For example, as depicted and described with respect to FIG. 1, a color match module 170 can identify a coating color based upon information received from a camera-enabled spectrophotometer 110.

FIG. 6 also shows that the method can include an act 620 of accessing a relative texture characteristic database. In at least one implementation, the relative texture characteristic database can comprise a set of relative texture characteristic relationships for one or more coatings that are related to the coating color. For example, as depicted and described with respect to FIGS. 3-5, a relative texture characteristic relationship can comprise an equation that associates various texture characteristics with texture variables received from an image of a target coating. The relative texture characteristic database can comprise a computer storage file of any type that stores relative texture characteristics of one or more coatings. For example, the relative texture characteristic database may be stored within the coating information database 140.

In various implementations, multiple equations may exist that describe different texture characteristics (e.g., overall perceived texture, overall perceived coarseness, overall perceived sparkle intensity, overall perceived sparkle density, etc.). Additionally, different equations may need to be developed for different color families. As such, in at least one implementation, the equations may be stored within a relative texture characteristic database that maps each equation to its desired input and output. As used herein, a relative texture characteristic database can comprise any data structure capable of storing at least one correlation between input data and particular texture characteristics.

In addition, FIG. 6 shows that the method can include an act 630 of calculating a correlation between target coating texture variables and coating texture variables of other coatings. Act 630 can comprise calculating a correlation between the target coating texture variables and target coating texture variables associated with the proposed matched coating. In at least one implementation, the proposed matched coating can be identified through a convention color match algorithm. Additionally, in at least one implementation, the proposed matched coating is any coating that the target coating is being compared against. For example, as depicted and described with respect to FIG. 5, an equation can be generated (e.g., via a processor at computing devices 160 that is executing application 100) that describes a general relationship between data received from a spectrophotometer and perceived texture characteristics. The target coating may comprise a coating type that has not previously been analyzed. As such, the input data received from the spectrophotometer can be correlated to previous input data received from previously analyzed coating.

Further, FIG. 6 shows that the method can include an act 640 of calculating a set of relative texture characteristics. Act 640 can comprise based upon the calculated correlation, calculating a set of relative texture characteristics for the proposed matched coating that indicate relative differences in texture between the proposed matched coating and the target coating. Each of the relative texture characteristics can comprise an assessment over all angles of the target coating. For example, as depicted and described with respect to FIGS. 2A-5, data received from a spectrophotometer 110 can be entered into an equation that correlates specific input data with perceived texture characteristics. The resulting correlation can be used to describe one or more texture characteristics of a target coating.

Further still, FIG. 6 shows that the method can include an act 650 of transmitting the relative texture characteristics to a display. Act 650 can comprise transmitting digital data capable of causing a display to depict the set of relative texture characteristics. For example, as depicted and described with respect to FIG. 1, a display module 150 can transmit resulting data to a display at computing devices 160 160 (referred to also as "client computer"). The client computer device 160 may comprise a remote computing device or a local computing device. As such, in various implementations, the coating texture calculation software 100 can be executed at a remote server, or locally on the client computer device 160.

Accordingly, implementations of the present invention provide unique and novel methods and systems for identify perceived texture characteristics. In particular, implementations of the present invention can map the texture characteristics of a particular target coating to a human-perceived texture characteristics based upon previously recorded human perceptions regarding other coatings. Implementations of the present invention provide significant benefit in the technical field of coating texture matching.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention therefore relates in particular, without being limited thereto, to the following aspects:

1. A computer implemented method comprising: receiving, using at least one processor, an image of a target coating, determining, using the processor, one or more texture variables from the image of the target coating, accessing, using the processor, a database comprising corresponding texture variables determined for a plurality of reference coatings and one or more associated relative texture characteristics obtained by comparative human rating of the visual appearance of different reference coatings, analyzing, using the processor, the data stored in the database to determine for each of the relative texture characteristics a statistical correlation between one or more of the texture variables and the respective relative texture characteristic; calculating, using the processor, a difference between the determined one or more texture variables of the target coating and the corresponding one or more texture variables associated with one or more coating(s) selected from the reference coatings; calculating, using the processor, from the calculated difference in the one or more texture variables, based upon the determined set of correlations, a set of relative texture characteristics for the target coating that indicates relative differences in texture of the target coating with respect to the selected one or more reference coatings; and displaying the calculated set of relative texture characteristics to a user.

2. The computer implemented method according to aspect 1, wherein each of the relative texture characteristics corresponds to an assessment of the respective coating over all viewing angles.

3. The computer implemented method according to any one of aspect 1 or aspect 2, wherein the image of the target coating, which can be a black and white image or a color image, is received from a camera-equipped spectrophotometer or from a camera, wherein the camera preferably has an at least three times optical zoom.

4. The computer implemented method according to any one of the preceding aspects further comprising determining, preferably by a spectrophotometer, a color associated with the target coating.

5. The computer implemented method according to any one of the preceding aspects, wherein the one or more coating(s) selected from the reference coatings are identified by a calculation, using the processor, for finding a proposed match of the visual appearance or color of the target coating from the plurality of reference coatings.

6. The computer implemented method according to any one of the preceding aspects, wherein the relative texture characteristics comprise a relative coarseness, a relative sparkle intensity and/or a relative sparkle density.

7. The computer implemented method according to any one of the preceding aspects further comprising calculating, using the processor, an overall relative texture value from the set of relative texture characteristics with respect to the each selected reference coating, and displaying the calculated overall relative texture value, optionally together with an indication of the associated reference coating, to a user.

8. A system comprising: a user interface comprising a display; a database comprising one or more texture variables determined from an image for each of a plurality of reference coatings and one or more associated relative texture characteristics obtained by comparative human rating of the visual appearance of different reference coatings, at least one processor in communication with the user interface and the database, wherein the at least one processor is configured to: receive an image of a target coating and determine one or more texture variables from the image of the target coating; access the database and analyze the data stored in the database to determine for each of the relative texture characteristics a statistical correlation between one or more of the texture variables and the respective relative texture characteristic; calculate a difference between the determined one or more texture variables of the target coating and the corresponding one or more texture variables associated with one or more coating(s) selected from the reference coatings; calculate, using the processor, from the calculated difference in the one or more texture variables, based upon the determined set of correlations, a set of relative texture characteristics for the target coating that indicates relative differences in texture of the target coating with respect to the selected one or more reference coatings; and display the calculated set of relative texture characteristics on the display to a user.

9. The system according to aspect 8, wherein each of the relative texture characteristics corresponds to an assessment of the respective coating averaged over all viewing angles.

10. The system according to any one of aspect 8 or aspect 9, further comprising a camera-equipped spectrophotometer or a camera in communication with the processor, wherein the camera preferably has an at least three times optical zoom.

11. The system according to any one of the preceding aspects 8-10, wherein the relative texture characteristics comprise a relative coarseness, a relative sparkle intensity and/or a relative sparkle density.

12. The system according to any one of the preceding aspects 8-11, wherein the processor is further configured to calculate an overall relative texture value from the set of relative texture characteristics with respect to the each selected reference coating, and to display the calculated overall relative texture value, optionally together with an indication of the associated reference coating, on the display to a user.

13. The system according to any one of the preceding aspects 8-12, being configured to determine, preferably by a spectrophotometer, a color associated with the target coating.

14. The system according to any one of the preceding aspects 8-13, wherein the processor is further configured to identify the one or more coating(s) selected from the reference coatings by a calculation for finding a proposed match of the visual appearance or color of the target coating from the plurality of reference coatings.

15. A non-transitory computer readable medium including software for causing a processor to: receive an image of a target coating and determine one or more texture variables from the image of the target coating; access a database comprising corresponding texture variables determined for a plurality of reference coatings and one or more associated relative texture characteristics obtained by comparative human rating of the visual appearance of different reference coatings; analyze the data stored in the database to determine for each of the relative texture characteristics a statistical correlation between one or more of the texture variables and the respective relative texture characteristic; calculate a difference between the determined one or more texture variables of the target coating and the corresponding one or more texture variables associated with one or more coating(s) selected from the reference coatings; calculate from the calculated difference in the one or more texture variables, based upon the determined set of correlations, a set of relative texture characteristics for the target coating that indicates relative differences in texture of the target coating with respect to the selected one or more reference coatings; and display the calculated set of relative texture characteristics to a user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A computer system for calculating coating textures indicators, comprising:
   one or more processors; and
   one or more computer-readable media having stored thereon executable instructions that are executable by the one or more processors to configure the computer system to perform at least the following:
      receive target coating texture variables from an image of a target coating, wherein the target coating texture variables comprise texture data variables generated from the image;
      access a relative texture characteristic database, wherein the relative texture characteristic database comprises a set of texture characteristic relationships for a plurality of coatings;
      calculate a correlation between the target coating texture variables and texture data variables associated with a compared coating;
      based upon the calculated correlation, calculate a set of relative texture characteristics for the target coating that indicate relative differences in texture between the target coating and the compared coating, wherein each of the relative texture characteristics comprises an assessment over all angles of the target coating; and
      transmit digital data that causes a display to depict the set of relative texture characteristics.

2. The computer system of claim 1, the executable instructions comprising instructions that are executable to configure the computer system to calculate an overall texture value based upon the calculated set of relative texture characteristics.

3. The computer system of claim 2, the executable instructions comprising instructions that are executable to configure the computer system to display on a graphical user interface an indication of the proposed matching coating and an indication of the overall texture value.

4. The computer system of claim 1, the executable instructions comprising instructions that are executable to configure the computer system to receive the image from a camera-enabled spectrophotometer.

5. The computer system of claim 4, wherein the camera-enabled spectrophotometer is configured to generate texture data based upon a black and white photograph.

6. The computer system of claim 4, wherein the camera-enabled spectrophotometer is configured to generate texture data based upon a color photograph.

7. The computer system of claim 1, the executable instructions comprising instructions that are executable to configure the computer system to receive the image from a camera.

8. The computer system of claim 7, wherein the camera comprises an at least three times optical zoom.

9. The computer system of claim 1, wherein the set of relative texture characteristics comprises a relative coarseness.

10. The computer system of claim 1, wherein the set of relative texture characteristics comprises a relative sparkle intensity.

11. The computer system of claim 1, wherein the set of relative texture characteristics comprises a relative sparkle density.

12. The computer system of claim 1, wherein the set of relative texture characteristics comprises a relative coarseness, a relative sparkle intensity, and a relative sparkle density.

13. The computer system of claim 1, the executable instructions comprising instructions that are executable to configure the computer system to:
   calculate an overall relative texture characteristic value, wherein the overall relative texture characteristic value is calculated from the set of relative texture characteristics; and
   transmit digital data capable of causing a display to depict the overall relative texture characteristic value.

14. The computer system of claim 1, wherein the set of relative texture characteristic relationships are derived from human provided relative impressions between different coatings.

15. The computer system of claim 14, wherein the relative impressions comprise a relative coarseness, a relative sparkle intensity, and a relative sparkle density with respect to a plurality of different coatings.

16. The computer system of claim 1, the executable instructions comprising instructions that are executable to configure the computer system to:
- identify a proposed matched coating from within the plurality of coatings; and
- based upon the calculated correlation, calculate a set of relative texture characteristics for a compared coating that indicate relative differences in texture between the compared coating and the target coating, wherein the compared coating comprises the proposed coating.

17. A computer system implemented method that includes one or more processors, for calculating a coating textures indicator, the method comprising:
- receiving target coating texture variables from a camera-enabled spectrophotometer, wherein the target coating texture variables comprise texture data variables generated by the camera-enabled spectrophotometer;
- identifying with a processor, based upon information received from the camera-enabled spectrophotometer, a coating color associated with a target coating;
- accessing with a processor a relative texture characteristic database, wherein the relative texture characteristic database comprises a set of relative texture characteristic for one or more coatings that are related to the coating color;
- identifying with a processor a proposed matched coating from within the plurality of coatings;
- calculating with a processor a correlation between the target coating texture variables and target coating texture variables associated with the proposed matched coating;
- based upon the calculated correlation, calculating with a processor a set of relative texture characteristics for the target coating that indicate relative differences in texture between the target coating and the proposed matched coating, wherein each of the relative texture characteristics comprises an assessment over all angles of the target coating; and
- transmitting with a processor digital data that causes a display to depict the set of relative texture characteristics.

18. The method of claim 17, wherein the set of relative texture characteristics comprises a relative coarseness, a relative sparkle intensity, and a relative sparkle density.

19. The method of claim 17, further comprising:
- calculating an overall relative texture characteristic value, wherein the overall relative texture characteristic value is calculated from the set of relative texture characteristics; and
- transmitting digital data capable of causing a display to depict the overall relative texture characteristic value.

20. A computer system implemented method that includes one or more processors, for calculating a coating textures indicator, the method comprising:
- receiving target coating texture variables from an image of a target coating, wherein the target coating texture variables comprise texture data variables generated from the image;
- accessing a relative texture characteristic database, wherein the relative texture characteristic database comprises a set of texture characteristic relationships for a plurality of coatings;
- calculating a correlation between the target coating texture variables and target coating texture variables associated with a plurality of different coatings;
- based upon the calculated correlation, calculating a set of relative texture characteristics for the target coating that indicate relative differences in texture between the target coating and the plurality of different coatings, wherein each of the relative texture characteristics comprises an assessment over all angles of the target coating;
- transmitting digital data that causes a display to depict the set of relative texture characteristics.

* * * * *